(12) United States Patent
Peirce et al.

(10) Patent No.: US 8,972,736 B2
(45) Date of Patent: Mar. 3, 2015

(54) FULLY AUTHENTICATED CONTENT TRANSMISSION FROM A PROVIDER TO A RECIPIENT DEVICE VIA AN INTERMEDIARY DEVICE

(75) Inventors: Kenneth L. Peirce, Grosse Pointe Farms, MI (US); Alfred C. Tom, San Francisco, CA (US); Robert A. Hrabak, Warren, MI (US)

(73) Assignee: General Motors LLC, Detroit, MI (US)

( * ) Notice: Subject to any disclaimer, the term of this patent is extended or adjusted under 35 U.S.C. 154(b) by 10 days.

(21) Appl. No.: 13/612,813

(22) Filed: Sep. 12, 2012

(65) Prior Publication Data
US 2014/0075198 A1 Mar. 13, 2014

(51) Int. Cl.
*H04L 12/22* (2006.01)
*H04L 29/06* (2006.01)
*H04L 12/16* (2006.01)

(52) U.S. Cl.
CPC ........ *H04L 63/0428* (2013.01); *H04L 63/0478* (2013.01); *H04L 63/123* (2013.01); *H04L 63/0281* (2013.01)
USPC ............................. 713/176; 173/161; 173/177

(58) Field of Classification Search
CPC .......... G09C 5/00; G09C 1/04; H04L 9/0877; H04L 9/086; H04L 9/3247; H04L 9/3287
See application file for complete search history.

(56) References Cited

U.S. PATENT DOCUMENTS 6,161,181 A * 12/2000 Haynes et al. ................. 713/170

OTHER PUBLICATIONS

Architecture for Secure and Private Vehicular Communications. Papadimitratos et al. IEEE(2007).*
ID-Based Safety Message Authentication for Security and Trust in Vehicular Networks. Biswas et al.IEEE(2011).*
A Secure Client on SmartPhone to Monitor Automotive Sensor Network. Luo et al. IEEE(2012).*

* cited by examiner

*Primary Examiner* — Venkat Perungavoor
(74) *Attorney, Agent, or Firm* — Anthony Luke Simon; Reising Ethington P.C.

(57) ABSTRACT

A method, system, and computer readable medium containing programming for handling fully authenticated transmission of video or other data (content) from a provider to a recipient device via an intermediary device. An inner envelope containing the content and/or security features is prepared and digitally signed using a private cryptographic key. The signed inner envelope is then included in a second, outer envelope which may also include some or all of the content. The outer envelope is also digitally signed, thereby forming a data package which may be sent from the provider to the intermediary device. If the signature of the outer envelope is authenticated at the intermediary device, then the inner envelope is sent to the recipient device which then uses the inner signature to verify its authenticity. Authenticated content may then be presented or otherwise used at the recipient device.

26 Claims, 5 Drawing Sheets

FULLY AUTHENTICATED CONTENT TRANSMISSION FROM A PROVIDER TO A RECIPIENT DEVICE VIA AN INTERMEDIARY DEVICE

TECHNICAL FIELD

The present invention relates generally to providing secure data to a recipient device and more specifically, to securely providing image data to an intermediary device which then securely provides the image data to the recipient device.

BACKGROUND OF THE INVENTION

Transport Layer Security (TLS) is a known technology used in digital networks to establish and carry out secure communication between two entities. The communicating entities can be devices such as computers or other electronic apparatus capable of digital communication, and the two entities can be communicating as peers or in a client/server configuration. TLS is implemented using digital certificates which, through public key cryptography (i.e., using public key infrastructure, PKI) and a common trusted entity, enable one or both of the communicating entities to authenticate the other and enable the two entities to exchange information confidentially. Secure Socket Layers (SSL) is an earlier form or predecessor of TLS that has been widely used over the Internet.

TLS is commonly used in TCP/IP networks using X.509 digital certificates which are typically issued by a trusted third party certificate authority (CA) and signed with the CA's private key. The holder (subject) of the certificate can then use it to authenticate itself to other entities. The associated CA public key is distributed to those entities as a part of a self-signed certificate. Authentication of a received digital certificate then involves using the CA's public key to decrypt the digital signature and compare the result to the contents actually contained in the certificate. More specifically, when the certificate is originally signed, a hash is performed of the certificate's contents and the result is encrypted using the CA's private key. This encrypted result is used as the digital signature and is appended to the certificate. Then, to authenticate, a recipient of the certificate uses the public key to decrypt the hash, and then compares this decrypted hash result with its own hash of the received certificate data items that it takes using the same hash function. If the two results match, then this indicates that the contents of the certificate are authentic. That authenticated content includes the certificate holder's (subject's) identity and public key so that the recipient of the certificate can now know that the identity is authentic and can communicate confidentially with the subject using its public key.

In wireless communication systems, a remote service entity may provide data to a target device using public key cryptography; this data is typically considered secure (so long as the holder of the private key, the remote service entity, keeps the private key secret). The data may then be passed to third entity also using public key cryptography between the target device and the third entity; however, the third entity may be unable to validate that the data is the original data sent by the remote service entity. For example, the third entity may be unable to confirm whether the data sent by the remote service entity is the same data received from the target device, because the target device may be subject to hacking, spoofing, etc.

SUMMARY OF THE INVENTION

According to an aspect of the invention, there is provided a method of providing secure data to an intermediary device for delivery to a recipient device. A preparing step includes preparing a data package to be transmitted from a provider using public key cryptography, comprising the steps of: (1) creating a first envelope to be used by the recipient device; (2) signing the first envelope using a first signature; (3) creating a second envelope containing the first envelope; and (4) signing the second envelope using a second signature corresponding to a public key accessible to an intermediary device. A sending step includes sending the data package to the intermediary device.

In accordance with another aspect of the invention, there is provided a method of preparing a data package. Preparing the data package includes the step of embedding one or more signed blocks among a plurality of data blocks in a data file. It further includes the step of generating an application check block (ACB), wherein the ACB maps the location of the signed blocks among the data blocks. It further includes the step of generating a first envelope, wherein the contents of the first envelope include the ACB. It further includes the step of signing the first envelope with a first signature, wherein the first signature uses a first private key. It further includes the step of generating a second envelope. And finally, it further includes the step of signing the second envelope with a second signature, wherein the second signature uses a second private key, wherein the content of the second envelope includes the first envelope.

In accordance with another aspect of the invention, there is provided a method of validating the security of data received at a recipient device from a provider via an intermediary device. A receiving step includes receiving at a recipient device a portion of an original data package from an intermediary device, wherein the portion includes a first envelope and a first signature associated with a first public key. In addition, the method includes using the first signature to validate the authenticity of the first envelope, wherein the original data package further comprises a second envelope and a second signature associated with a second public key used by the intermediary device to validate that the data package was sent by the provider. The first envelope may be part of the payload of the second envelope.

In accordance with another aspect of the invention, there is provided a computer readable medium for use by an intermediary device to receive and process a data package and send on to a receiving device a secured envelope obtained from the data package. The computer readable medium includes a data storage device having stored thereon a computer readable application program that upon execution by an intermediary device, causes the intermediary device to prepare a portion of an original data package received by the intermediary device for transmission to a recipient device. The original data package includes a first envelope and a second envelope; and the first envelope may be contained within the second envelope. Both envelopes may be signed using a private key.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to providing secure (authenticatible) data to a recipient device from a provider via a second (intermediary) device. The security of the data includes multi-layer cryptography; i.e., the overall data package sent from the provider includes an inner (first) message or envelope that is secured by a first signature and an outer (second) message that includes the first envelope and that is secured by a second signature. The transmission between the provider and the intermediary device involves validation of the second envelope using the second signature at the intermediary device, and once validated, the first (inner) envelope is extracted and sent from the intermediary device to the recipient device where it is validated using a first signature. Thus, in at least one implementation, the first envelope and signature are embedded within the payload covered by the second signature. For example, the secure data provided by the provider may be a video file that is to be sent for display in a vehicle (the recipient device) via a handheld phone (the intermediary device). In particular, the recipient device may be a vehicle telematics unit, human machine interface (HMI), and/or an audio and/or video presentation unit (e.g., a display) within the vehicle. The cryptography used may be PKI (public key infrastructure). Thus, the handheld communications (intermediary) device may utilize a public key to authenticate the payload of the second (outer envelope) using the second signature. The data being transmitted (e.g., the video file) may be contained in either the inner or outer envelope. For example, for video streaming from the intermediary device to the recipient device, the video file may be contained in the outer (second) envelope and, once authenticated using the second signature, streaming of the video to the recipient device may commence. By receiving the first envelope and first signature, the recipient device may authenticate the first envelope and use this information to validate the video stream and present it. If the inner (first) envelope cannot be authenticated, then no video is displayed. In this way, hacked or otherwise unauthorized video or other data may be blocked from being displayed or otherwise used at the recipient device.

Authentication of the signatures may be done in a known manner; e.g., such as via a digital certificate sent as a part of the overall data package. As is known, signing of the contents of an envelope may be done by performing a hash of the envelope contents and encrypting the hash digest with a private key. The public key may then be sent with the signed envelope (or as a part of the envelope) and then used by a receiving device to decrypt the hash digest for comparison to a hash digest generated by the receiving device itself on the envelope contents. If the two hash digests match, then the receiving device can be certain that the signature is valid and can trust that the envelope came from the trusted source and has not been corrupted, intentionally or otherwise.

An application or operating system software on the intermediary device may handle the receipt, validation, and retransmission of the first envelope and other data to the recipient device. The telematics unit or other recipient device may further perform additional security checks to ensure the authenticity of the video being provided to the vehicle for display. Generally, PKI may provide adequate security between the provider and the handheld communications device. However, without the multi-level validation provided by the disclosed embodiments, a security weakness may exist between the intermediary device and the vehicle because no specifically tailored security element exists for the intermediary device software application transmitting the video to the vehicle display.

Communications System—

Figure 1:
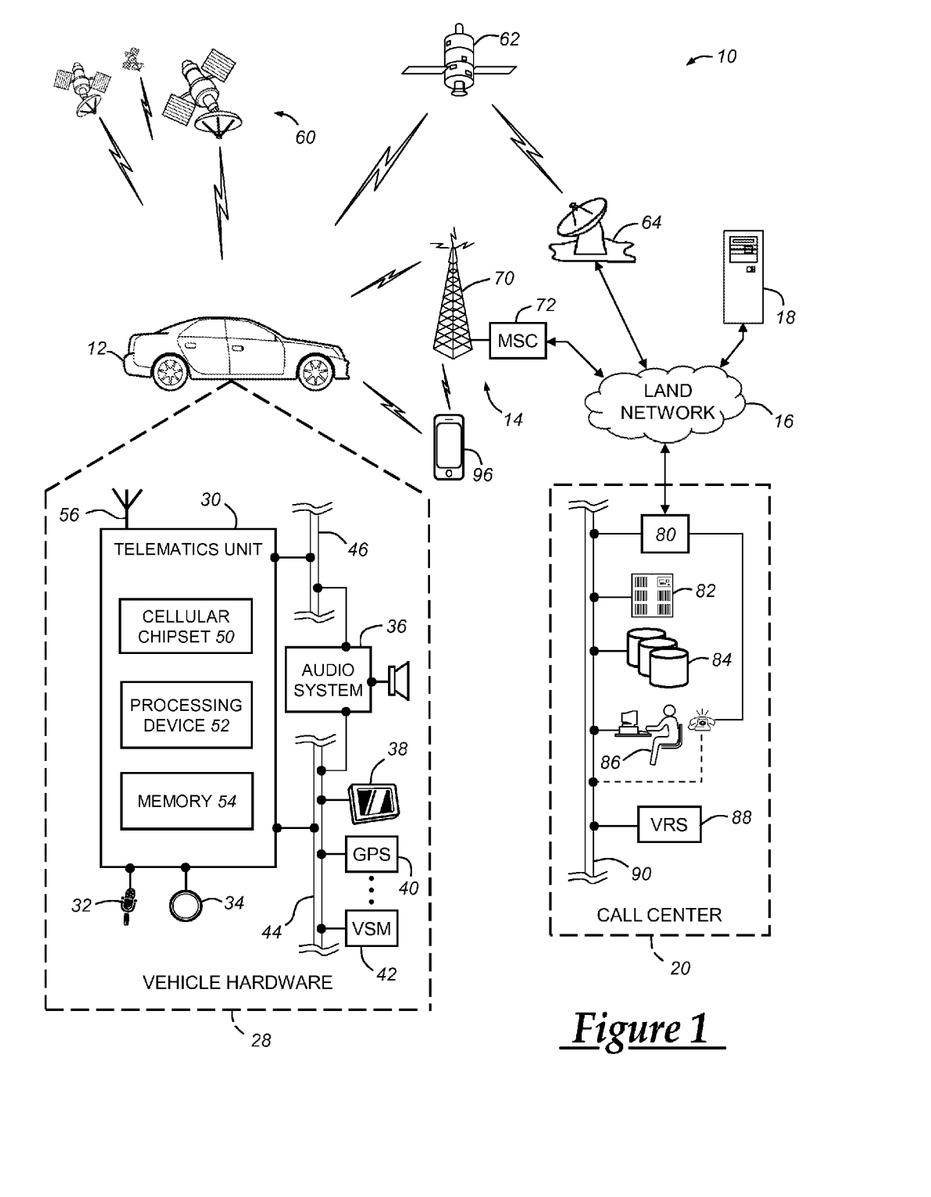
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a provider such as a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, WiFI-Direct, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); a cryptographic module (CM) 280 for secure data transmissions; diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

For example, the cryptographic module (CM) 280 may be located in the telematics unit or external thereto. The CM may include any hardware and/or associated software and/or firmware necessary to perform encryption, decryption, and hashing functionalities; in some implementations, the CM 280 may utilize public key infrastructure or PKI.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. A head unit 29 may include visual display 38 and/or other vehicle electronics (e.g., a microphone, pushbuttons, audio system components, etc.). In some implementations, the head unit 29 or visual display 38 may include the cryptographic module (CM) 280 (e.g., in lieu of the CM being located in the telematics unit). In addition, vehicle electronics 28 includes various wired connector interfaces (e.g., USB); such interfaces may enable power and/or communication with other vehicle electronics and/or the vehicle buses 44, 40. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88 and optionally a hardware security module (HSM) 230, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The HSM 230 in the call center 20 may include any hardware and/or associated software and/or firmware necessary to perform encryption, decryption, key generation (e.g., generating a root certificate (or public key) and private key), and hashing. In some instances, the HSM may have a user interface for use by live advisors and/or other call center personnel. HSMs are well-known.

It should be appreciated that the call center 20 is merely one example of a provider capable of providing services and communication with one or more vehicles and/or one or more handheld communication devices (HCDs, or personal mobile devices). Services may include providing media or image data to HCDs and other telematics-equipped devices; image data should be construed broadly to include any text, pictures, graphics, video, etc. regardless of format.

The HCD 96 may be an electronic device which may be used to make mobile telephone calls across a wide geographic area where transmissions are facilitated by the wireless communication system 16 (also shown in FIG. 1). The HCD may include: hardware, software, and/or firmware enabling cellular telecommunications and communications via short-range wireless communication (e.g., WiFi Direct and Bluetooth) as well as other HCD applications. Such HCD applications may include software applications, which may be preinstalled or installed by the user and/or via a graphical user interface (GUI) to control the hardware device using firmware and/or software. Furthermore and as will be appreciated by skilled artisans, the HCD 96 may have a network application (e.g., a software application) 260 enabling graphics, media, and/or image data executed on the HCD to be transmitted to a predetermined or preselected remote, auxiliary display and to be displayed thereon. The auxiliary display may be a dumb display—i.e., it may not accept input or otherwise permit interactivity with e.g., a media file being transmitted from the HCD. However in other instances the auxiliary display may allow interactivity. The transmission between the HCD and the predetermined display may be wired or wireless; interface examples include USB, Wi-Fi Direct, Bluetooth, etc. (e.g., these and other interfaces may communicate with the vehicle head unit 29, the telematics unit 30, other vehicle electronics 28, etc.). Commercial implementations of the software application include virtual network computing (or VNC™) and remote frame buffer (or RFB™ protocol).

The hardware of the HCD 96 may comprise: a display, a keypad (e.g., push button and/or touch screen), a microphone, one or more speakers, motion-detection sensors (such as accelerometers, gyroscopes, etc.), and a camera. In addition to the aforementioned features, modern HCDs may support additional services and/or functionality such as short messaging service (SMS or texts), multimedia messaging service (MMS), email, internet access, short-range wireless communications (e.g., Bluetooth or WiFi Direct), as well as business and gaming applications. Non-limiting examples of the HCD 96 include a cellular telephone, a personal digital assistant (PDA), a Smart Phone, a personal laptop computer having two-way communication capabilities, a netbook computer, or combinations thereof. The HCD 96 may be used inside or outside of a mobile vehicle (such as the vehicle 12 shown in FIG. 1), and may be configured to provide services according to a subscription agreement with one or more third-party facilities.

HCD 96 can connect wirelessly to telematics unit 30 via short range wireless communication and wirelessly to remote networks and devices via wireless communication system 14. This enables it to act as an intermediary device between a provider such as call center 20 and telematics unit 30.

The HCD 96 may include a cryptography module (CM) 270—i.e., it may include any hardware and/or associated software and/or firmware necessary to perform encryption, decryption, and hashing functionalities (e.g., public key infrastructure or PKI).

The HCD 96 may also have an authentication application 250. The application may be software, firmware, or a component of the operating system of the HCD that enables the HCD to handle authentication, processing, and re-transmission of the contents of a multi-layer data package. More specifically, the encryption application may operate with the CM 270 to authenticate an outer envelope of the data package and then extract an inner envelope contained within the outer envelope. The authentication application may then prepare the inner envelope for transmission to the recipient device. In other embodiments, the functions of the authentication application may be separated into two or more apps or program modules such that one handles authentication and the other handles retransmission of the inner envelope to the recipient device. Other such implementations will become apparent to those skilled in the art.

The HCD 96 and the vehicle 12 may be used together by a person such as the vehicle user. The vehicle user does not need to be the driver of the vehicle 12 nor does the vehicle user need to have ownership of the HCD 96 or the vehicle 12 (e.g., the vehicle user may be an owner or a licensee of either or both).

Application vendors or content manufacturers may generate or create data files which may be transmitted between providers such as the call center 20 and intermediary devices such as the HCD 96; in addition, the data files may be intended to ultimately reach a recipient device such as the vehicle 12. The data files may include image data, and the image data may be a collection, arrangement, or configuration of coded and non-coded data and/or encrypted and non-encrypted data. The data files may be stored and/or transmitted using volatile and/or nonvolatile memory. As noted above, in an example implementation, the data is audio and/or video data that is meant ultimately for presentation within the vehicle via one or more OEM-installed head units 29 such as by using audio system 36 or video display 38.

Method—

Figure 2:
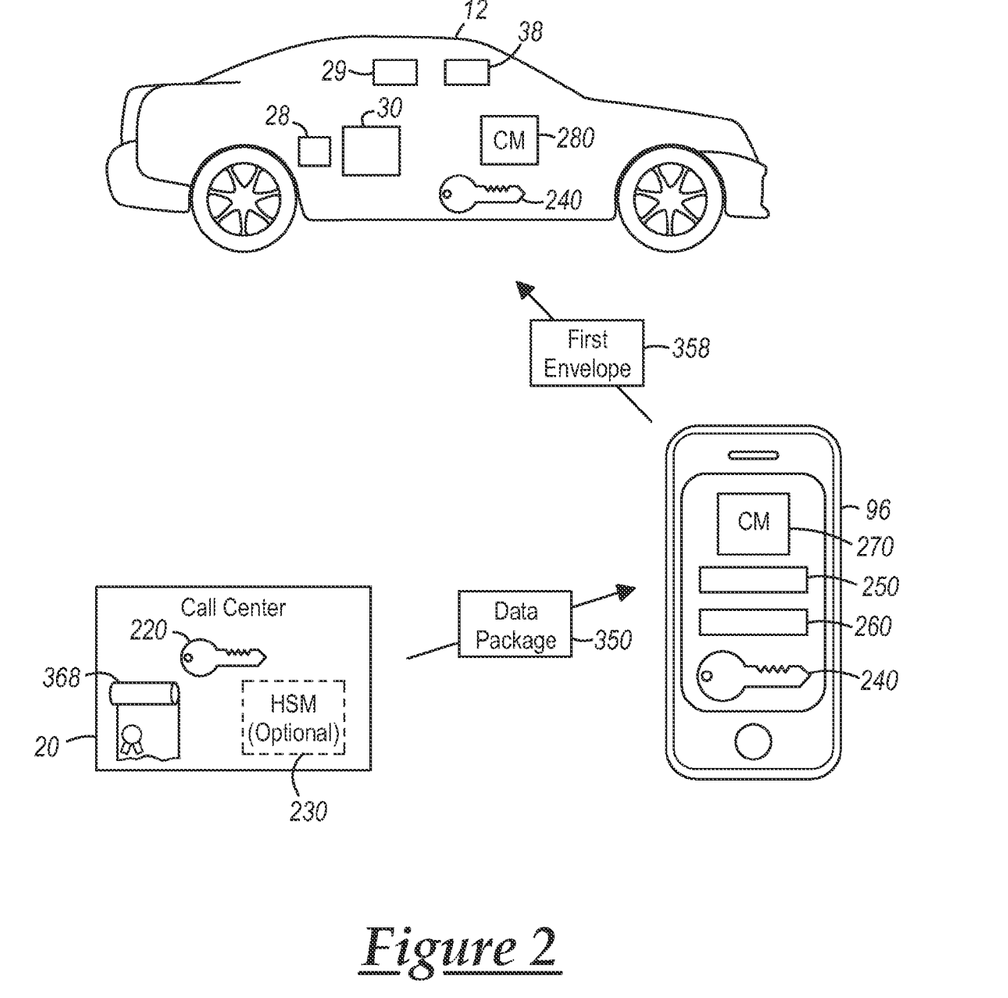
FIG. 2 is another block diagram depicting the exemplary embodiment.

Turning now to FIG. 2, there is shown one implementation illustrating a provider, a recipient device, and an intermediary device. Here, the provider is the call center 20; the recipient device is the vehicle 12; and the intermediary device is the HCD 96. The call center 20 may be a holder of both the root certificate 368 and the associated private key 220. In addition, the call center may be a certificate authority (CA) or subordinate-CA; e.g., the call center may have an HSM 230 for key generation (i.e., creating public and private keys). The HCD 96 is illustrated as including the public key 240 (associated with the private key 220), encryption software 250, network software application 260, and the CM 270. The vehicle 12 is illustrated as including the public key 240, CM 280, the telematics unit 30, vehicle head unit 29, visual display 38, and other parts of the vehicle electronics 28. The public key in the vehicle 12 may or may not be the same public key as in the HCD 96. Furthermore, in some embodiments, prior to the HCD 96 receiving the data package 350, the HCD may not have the public key 240; similarly, prior to the vehicle 12 receiving the first envelope 358, the vehicle may not have the public key 240. Any or all of these different modules shown may be combined together into a single unit as necessary or desirable.

Figures 3A, 3C:
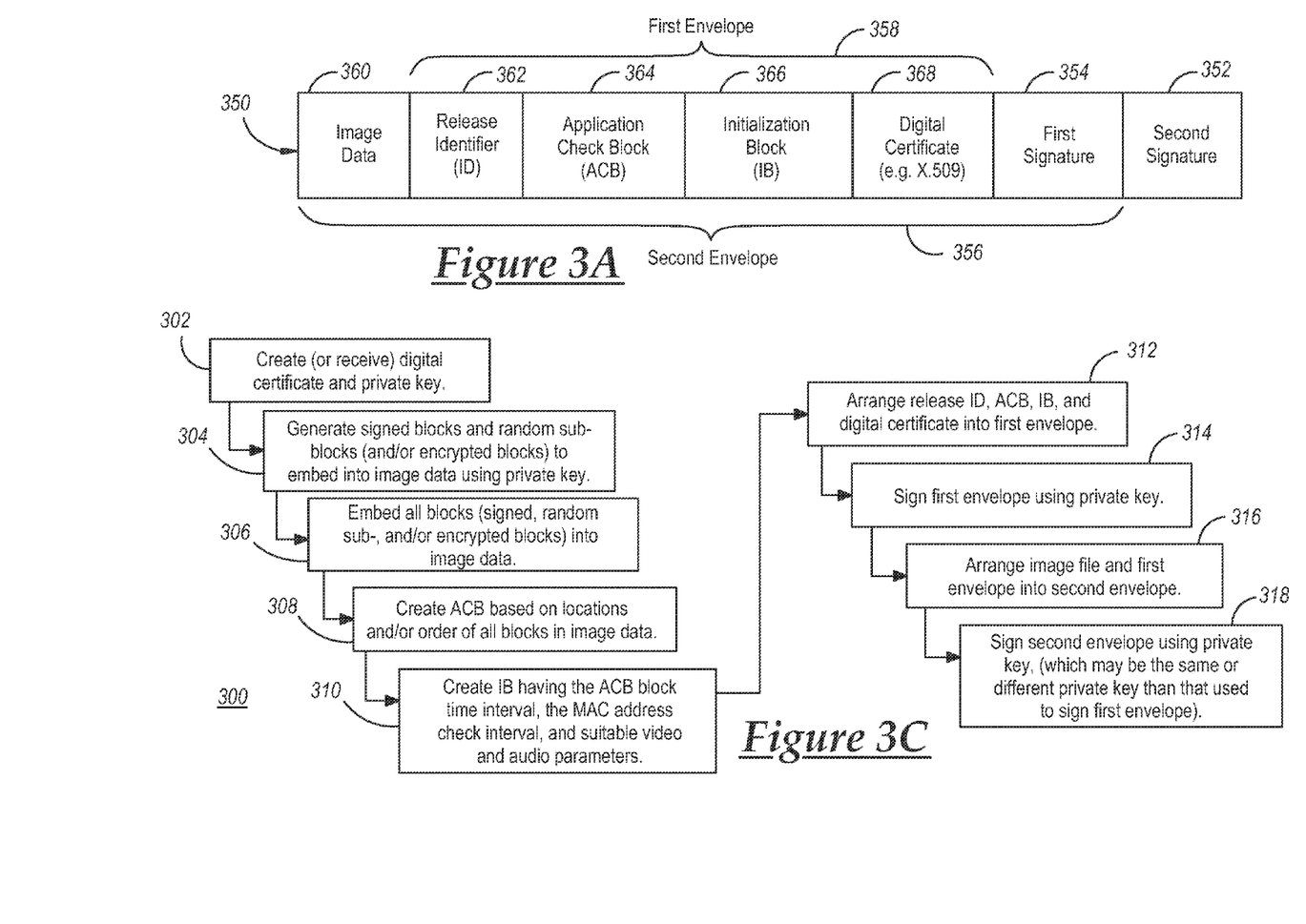
FIG. 3A is an exemplary embodiment of a data package.
FIG. 3C is a flowchart depicting another exemplary embodiment.

Turning now to FIG. 3A, there is shown an exemplary data package 350. The data package includes a first signature 354, a second signature 352, a first envelope 358, and a second envelope 356. In the illustrated example, the second signature 352 and second envelope 356 comprise the entirety of the data package 350—although other implementations exist. The second envelope includes image data 360 (e.g., payload data), the first envelope 358, and the first signature 354. The first envelope 358 includes: a release identifier (ID) 362, an application check block (ACB) 364, and initialization block (IB) 366, and a digital certificate (e.g., X509) 368 (e.g., additional payload data). Although not shown, the first envelope 358 may include additional data (e.g., image data/files or data files or additional digital certificates).

Figure 3B:
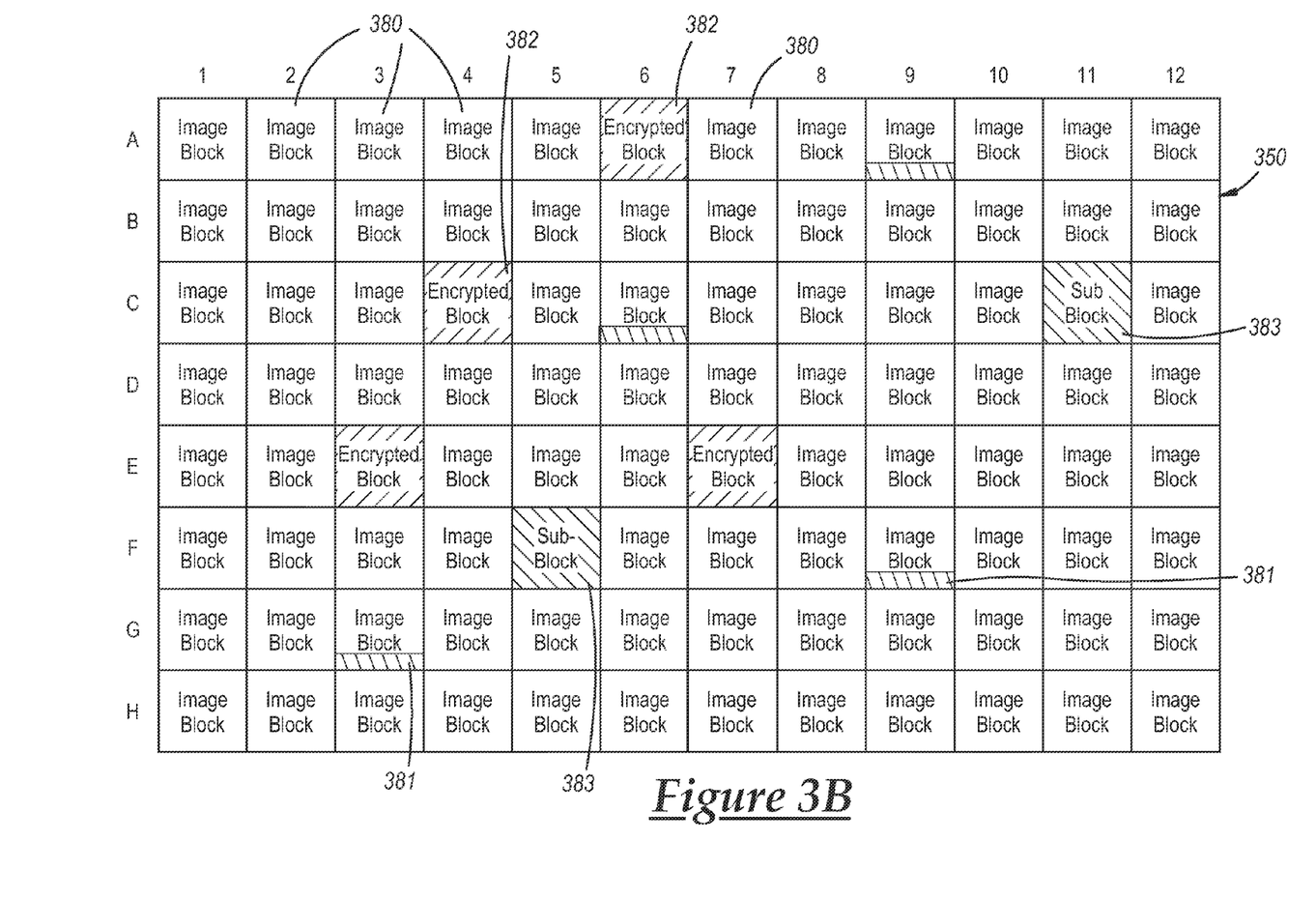
FIG. 3B is an exemplary embodiment of an image data file.

As shown in FIG. 3B, image data 360 may be comprised of a plurality of image blocks of data 380. It should be appreciated that the data within the data file may or may not be image data (i.e., image data is merely exemplary); e.g., instead of image data or an image data file, it may be a data file comprised of data blocks rather than image blocks. The image blocks 380 may be data frames or any other segment or portion of the image (video) data carrying information. Some of the image blocks 380 may have a digital signature appended thereto; e.g., image block signatures 381 (e.g., to authenticate the source of the image data). In addition, the signatures 381 may be randomly located or placed. As will be appreciated by skilled artisans, the location of both the image blocks which are signed 381 may be determined or known according to a grid, map, or array of such blocks (e.g., making up the entire file). For example, in FIG. 3B, the image blocks with an image blocks signature appended thereto are located at array locations F9, A9, C6, and G3. In other embodiments, the image blocks may be identified differently; for example, they may simply be serially numbered.

The process by which an image block may be signed is known to skilled artisans. For example, a hash function may be applied to the data of the image block to generate a first digest; the first digest may then be encrypted using a private key to create an encrypted value (e.g., this may be the private key 220 of the call center or may be a private key of the application vendor). The—encrypted value—may constitute the signature. The signature may be appended to the image block, and together these constitute the signed image block. This may be repeated for additional image blocks. It is to be further appreciated that in order to validate the signature of an image block, the recipient of the image block signature 381 (or recipient device) may perform the same hash function on the image block yielding the first digest and also use a public key associated with the private key to decrypt the encrypted value which yields a second digest. The signature is validated when the first digest is identical to the second digest.

In addition to some of the image blocks being signed, the image data may also include encrypted blocks 382 (which may or may not be intended for display). The encrypted blocks may include or carry security information to ensure that the image file is viewed only by its intended recipient. In addition, the encrypted blocks 382 may be randomly located or embedded among the image blocks 380. As will be appreciated by skilled artisans, the location of the encrypted blocks may be determined or known according to a grid, map, or array of such blocks (e.g., making up the entire file). For example, in FIG. 3B, the encrypted blocks are located at array locations A6, C4, E3, and E7.

The release ID 362 may include information regarding the software release or software version associated with the particular software application (e.g., VNC), or the version of the video (image) data being transmitted, or the version of the codec used by the video data.

The IB 366 may include one or more parameters including an ACB block time interval, an MAC address check interval, and/or any suitable video and audio parameters (e.g., parameters for enhancing quality during playback).

The ACB block time interval t1 (e.g., t1 seconds or t1 milliseconds) may be a value predetermined by the content provider and may be a parameter used to check or verify the continuing validity of the data sent to the recipient device.

The IB 366 MAC (or media access control) address check interval t2 (e.g., t2 seconds or t2 milliseconds) may be a value predetermined by the content provider or call center, or other entity, and may be used as another parameter used to check or verify the continuity of a session between the intermediary device and the recipient device. For example, upon expiration of each time interval t2, the MAC address (or Bluetooth device name, identifier, etc.) may be checked to insure that it has not changed. The MAC address may be the Bluetooth or WiFi-Direct address associated with the intermediary device (e.g., the HCD 96). For improved security, the value of t2 may be a randomly selected value.

The ACB 364 may contain additional information for periodically checking the session continuity between the intermediary device and the recipient device and whether the data file (e.g., video file) received by the recipient device is the original data file sent from the provider. For example, with respect to an image file, the ACB may include listing or mapping information of signed image blocks, encrypted blocks, and random data sub-blocks.

For example, the ACB may include mapping information of image blocks with an image block signature 381 appended thereto at array locations F9, A9, C6, and G3, and a listing of the encrypted blocks at array locations A6, C4, E3, and E7 (FIG. 3B). Therefore, if the signed image blocks with the image file are not in the mapped locations, the file can be presumed to be corrupted, hacked, substituted, etc. In addition, if the encrypted blocks are not in the mapped locations, the filed can be presumed to be corrupted. Furthermore, the encrypted blocks may enable only the intended recipient to view the image file (e.g., the intended recipient holding the recipient's private key).

The ACB 364 may also contain mapping information regarding a predetermined amount of random data (i.e., one or more sub-blocks 383 of random data) which may be embedded within the image data (e.g., FIG. 3B, at array locations C11 and F5). This data may be for security purposes only and may not be intended to be viewable. For example, there may be 1024 hex bytes of random data which the application vendor may have embedded into the image file in at least eight independently located sub-blocks of 128 bytes (i.e., non-contiguous initialized memory). According to the ACB, these sub-blocks 383 may be called by the recipient device (e.g., the vehicle head unit) which in turn may validate that they are received in their original order. Furthermore, the recipient device may further validate that each sub-block is called and/or received according to the ACB block time interval t1 (in the IB). In at least one embodiment, the sub-blocks may not be sent using a separate Bluetooth service or channel such as SPP (or sequenced packet protocol).

The digital certificate 368 may include a certificate, a certificate signature algorithm, and a certificate signature. The certificate itself may include a version, a serial number, an algorithm ID, an issuer, a validity date range, a subject, subject public key information (e.g., public key algorithm, subject public key, etc.), an issuer unique identifier, a subject unique identifier, one or more extensions, etc. The format of the digital certificate may be compliant with the International Telecommunication Union (ITU) Telecommunication Standardization Sector (ITU-T); i.e., X.509. Digital certificate technology is known to skilled artisans. Alternatively, a compact certificate may be used that has a reduced size to help minimize data transmission costs.

Now turning to FIG. 3C, the figure illustrates a flowchart 300 describing the preparation or compilation of a data package 350. This method may be executed by an application vendor or a provider such as the call center 20. The method begins at step 302 where a digital certificate 368 and private key 220 are received by the content provider (originator) or other application vendor; in some instances, the application vendor may also be a certificate authority (CA) (or subordinate CA) also generating or creating the certificate and private key 220. In step 304, the application vendor generates one or more blocks and/or sub-blocks using the private key. The blocks may include signed blocks 381, encrypted blocks 382, and/or sub-blocks having random data 383. These blocks may later be embedded into a data file such as the image data file shown in FIG. 3B [step 306]. Embedding the blocks 381, 382, 383 among the image blocks 380 may be randomized (e.g., the location of the blocks may randomly be selected by a computer program or algorithm). Based upon the locations of the blocks, an application check block (ACB) may be created [step 308]. In addition, the ACB may include information pertaining to the order or sequence in which the blocks 381, 382, and/or 383 are later called up by or received by the recipient device. At step 310, an initialization block (IB) may be created which includes the ACB block time interval, the MAC address check interval, and/or any suitable video and/or audio parameters. Next at step 312, the provider may arrange or otherwise compile one or more of the following components of the data package 350 into a first envelope 358: a release ID, the ACB, the IB, and the digital certificate. Thereafter, the provider may sign the first envelope using the private key [step 314] creating the first signature 354. Then, the provider may arrange the image data 360 and the content of the first envelope 358 into a second envelope 356 [step 316]. And lastly, the provider may sign the second envelope using the private key [step 318] creating the second signature 352. It should be appreciated that a different private key may or may not be used to sign the image blocks 380, the first envelope 358, and the second envelope 356; e.g., in one embodiment, the image blocks 380 and the first envelope 358 may be signed by a first private key and a second private key may be used to sign the second envelope (here, for example, the public key associated with the second envelope may be known to the intermediary device or it may be further appended to the data package). Thus, the data package 350 may include a second envelope 356 and the second signature 352.

Figure 4:
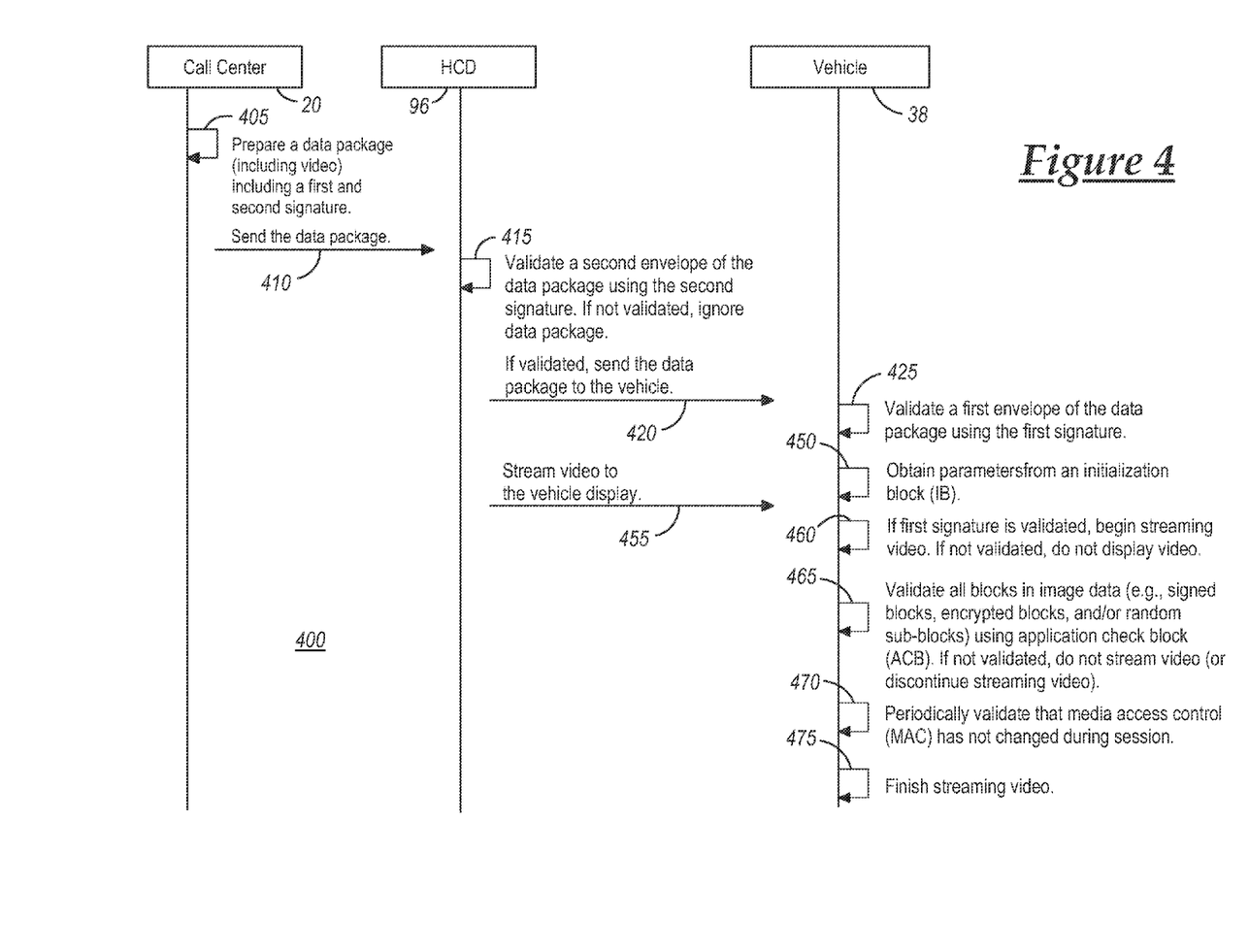
FIG. 4 is a flow diagram depicting yet another exemplary embodiment.

Turning now to FIG. 4, there is shown a flow diagram 400 illustrating one exemplary sequence between the call center 20, the HCD 96, and the vehicle display 38. The method begins with step 405 where a data package is prepared at the call center that includes image data (here, a video file) as well as the first and second signatures. The data package may also include the release ID, the ACB, and the IB, and the digital certificate (e.g., X509). At step 410, the call center sends or transmits the data package to the HCD (e.g., using the wireless carrier system 14, a land communications network 16, a computer 18, and/or any other suitable means). The HCD validates a second (outer) envelope of the data package with the second signature; and if the second signature is not valid, the data package is ignored [step 415]. However, if the second signature is validated, the first envelope and first signature are sent to the vehicle 12 [step 420] (e.g., to the CM 280 which may be located in various areas of the vehicle, as previously described). At step 425, the CM may validate the first envelope of the data package using the first signature. It may also validate the IB included in the data package using the first signature [step 450]. In addition, the CM 280 may record or otherwise cause to be stored the media access control (MAC) address of the HCD for later use. According to a network software application executed by the HCD, video may be streamed to the vehicle display 38 [step 455]. In at least one embodiment, the streaming video is received by, passed through, and/or otherwise monitored by the telematics unit 30 (e.g., via Bluetooth, Wi-Fi Direct, USB, etc.). Provided both the first signature and IB are validated by the CM 280, the telematics unit may permit the video to be displayed on the display 38; however, if both are not validated, the video may not be displayed [step 460]. At step 465, the CM 280 may validate embedded blocks in the image data using the ACB; the blocks may be encrypted and/or signed and may thus require decryption and/or validation using the first signature 354. Step 465 may occur prior to or during the display of the video. In addition, at step 470 the display periodically may validate during the streaming of the video that the MAC address (e.g., the Bluetooth or Wi-Fi Direct MAC address) of the HCD has not changed. Provided all authentications are valid, the video stream may be completed and/or end at step 475.

As noted above, apart from using the above-described technology and methods for transmission of video and other image data, it may also be used to transmit other content, such as audio, text, or binary data.

The programming used to implement the various parts of the functions and methods described herein may be realized as a computer readable medium comprising computer instructions stored on a digital storage device, such as solid state (e.g., flash) memory, magnetic media, optical media, etc. Thus, for example, the HCD 96 may include suitable software stored in computer readable memory on the device, and the programming necessary to produce the computer code will be known to those skilled in the art. Similarly, the computer instructions used in the vehicle head electronics needed to handle authentication and display or other processing of the received content may be stored as one or more program modules on one or more computer readable media.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing secure data to an intermediary device for delivery to a recipient device, comprising the steps of:
  (a) preparing a multi-layer cryptographic data package using a hardware security module (HSM) for transmission from a provider using public key cryptography, comprising the steps of:
    (1) creating a first envelope to be used by the recipient device at the HSM;
    (2) signing the first envelope using a first signature at the HSM, wherein a first cryptographic layer comprises the first envelope and first signature;

(3) creating a second envelope containing the first cryptographic layer and content data at the HSM; and (4) signing the second envelope at the HSM using a second signature corresponding to a public key accessible to the intermediary device, wherein a second cryptographic layer comprises the second envelope and the second signature; and (b) sending the data package from the HSM to the intermediary device, wherein the provider is a vehicle call center.

2. The method of claim 1 wherein the intermediary device comprises one of the following: a cellular telephone, a personal digital assistant (PDA), a smart phone, a personal laptop computer, or a netbook computer.

3. The method of claim 1 wherein the first envelope further comprises payload data to be received by the recipient device.

4. The method of claim 1 wherein the second envelope further comprises payload data to be received by the recipient device.

5. The method of claim 1 wherein a payload of the first envelope includes a plurality of data blocks, wherein one or more of the plurality of data blocks are digitally signed and have a signature different than the first or second signature.

6. The method of claim 1 wherein the first envelope includes a release identifier (ID), an application check block (ACB), an initialization block (IB), an X.509 certificate, or any combination of these.

7. The method of claim 6 wherein the one or more digitally signed data blocks are embedded among the remaining plurality of data blocks.

8. The method of claim 7 wherein the ACB includes a mapping of the location of the one or more digitally signed data blocks.

9. The method of claim 1 wherein the first signature corresponds to the public key.

10. The method of claim 9 wherein the public key corresponding to the second signature is different from the public key corresponding to the first signature.

11. A method of preparing a data package, comprising the steps of:

(a) preparing a data file for a payload of a first envelope, wherein the preparing step includes:
providing a plurality of data blocks;
digitally signing one or more of the plurality of data blocks; and
embedding the one or more digitally signed blocks among the remaining of the plurality of data blocks;

(b) generating an application check block (ACB), wherein the ACB maps the location of the digitally signed blocks among the plurality of data blocks;

(c) generating the first envelope, wherein the first envelope comprises the ACB;

(d) signing the first envelope with a first signature, wherein the first signature is different from the signature(s) used to digitally sign the one or more of the plurality of data blocks, wherein the first signature uses a first private key;

(e) generating a second envelope; and then (f) signing the second envelope with a second signature, wherein the second signature is different from the signature(s) used to digitally sign the one or more of the plurality of data blocks, wherein the second signature uses a second private key, wherein the second envelope comprises the first envelope, wherein a first cryptographic layer comprises the first envelope and the first signature, wherein a second cryptographic layer comprises the second envelope and the second signature, wherein the data package prepared in steps (a)-(f) are performed by a vehicle call center for cellular transmission.

12. The method of claim 11 wherein the data file includes image data.

13. The method of claim 11 wherein the first private key is identical to the second private key.

14. A method of validating the security of data received at a recipient device from a provider via an intermediary device, comprising the steps of:

(a) receiving at a vehicle equipped with a cryptography module a portion of an original multi-layer cryptographic data package from an intermediary device, wherein the portion includes a first envelope and a first signature associated with a first public key that was extracted from the original multi-layer cryptographic data package, wherein the first envelope comprises a plurality of unsigned data blocks and at least one digitally signed data block embedded within the plurality of unsigned data blocks;

(b) using the first signature to validate the authenticity of the first envelope,
wherein the original data package further comprised, prior to the extraction, a second envelope and a second signature associated with a second public key used by the intermediary device to validate the data package sent by the provider,
wherein the first envelope is part of the payload of the second envelope, and wherein the provider is a vehicle call center; and (c) using the at least one digitally signed data block to validate the authenticity of the first envelope.

15. The method of claim 14 wherein the first envelope comprises multiple digitally signed blocks, wherein the authenticity of the first envelope is partially based on a sequence that the multiple digitally signed blocks are received.

16. The method of claim 14 wherein the first envelope further comprises an initialization block (IB) containing initialization parameters.

17. The method of claim 14 wherein the digitally signed blocks are signed using a private key associated with the first public key.

18. The method of claim 17 wherein the first envelope further comprises an application check block (ACB) that comprises a mapping of the location of the digitally signed blocks within the plurality of unsigned data blocks.

19. The method of claim 18 wherein the plurality of unsigned data blocks and the at least one digitally signed data block are received by the recipient device as streaming video, wherein the recipient device validates the at least one digitally signed block while the video is being received.

20. The method of claim 19 wherein if the at least one digitally signed block is not validated, the streaming video is discontinued.

21. The method of claim 19 wherein recipient device periodically validates during the streaming video that a media access control (MAC) address of the intermediary device has not changed.

22. The method of claim 14 wherein the second envelope further comprises data blocks.

23. A non-transitory computer readable medium for use by an intermediary device to wirelessly receive and then process a data package and, after the data package is processed, wirelessly send to a receiving device a secured envelope extracted from the data package, the non-transitory computer readable medium comprising a data storage device having stored thereon a computer readable application program that upon execution by an intermediary device, causes the intermediary device to prepare a portion of an original data package received by the intermediary device for transmission to a recipient device, wherein the original data package originates from a hardware security module (HSM) remotely located from the intermediary device at a vehicle call center, wherein the original data package includes: a first envelope, a first signature associated with the first envelope, a second envelope, and a second signature associated with the second envelope, wherein the first envelope and first signature are contained within the second envelope.

24. The method of claim 23 wherein the application is one of the following: a software application or a component of the operating system of the intermediary device.

25. The method of claim 23 wherein the intermediary device has a cryptography module for decoding a signature associated with the second envelope.

26. The method of claim 23, wherein the private key used to sign the first envelope is different than the private key used to sign the second envelope.

* * * * *